UNITED STATES PATENT OFFICE.

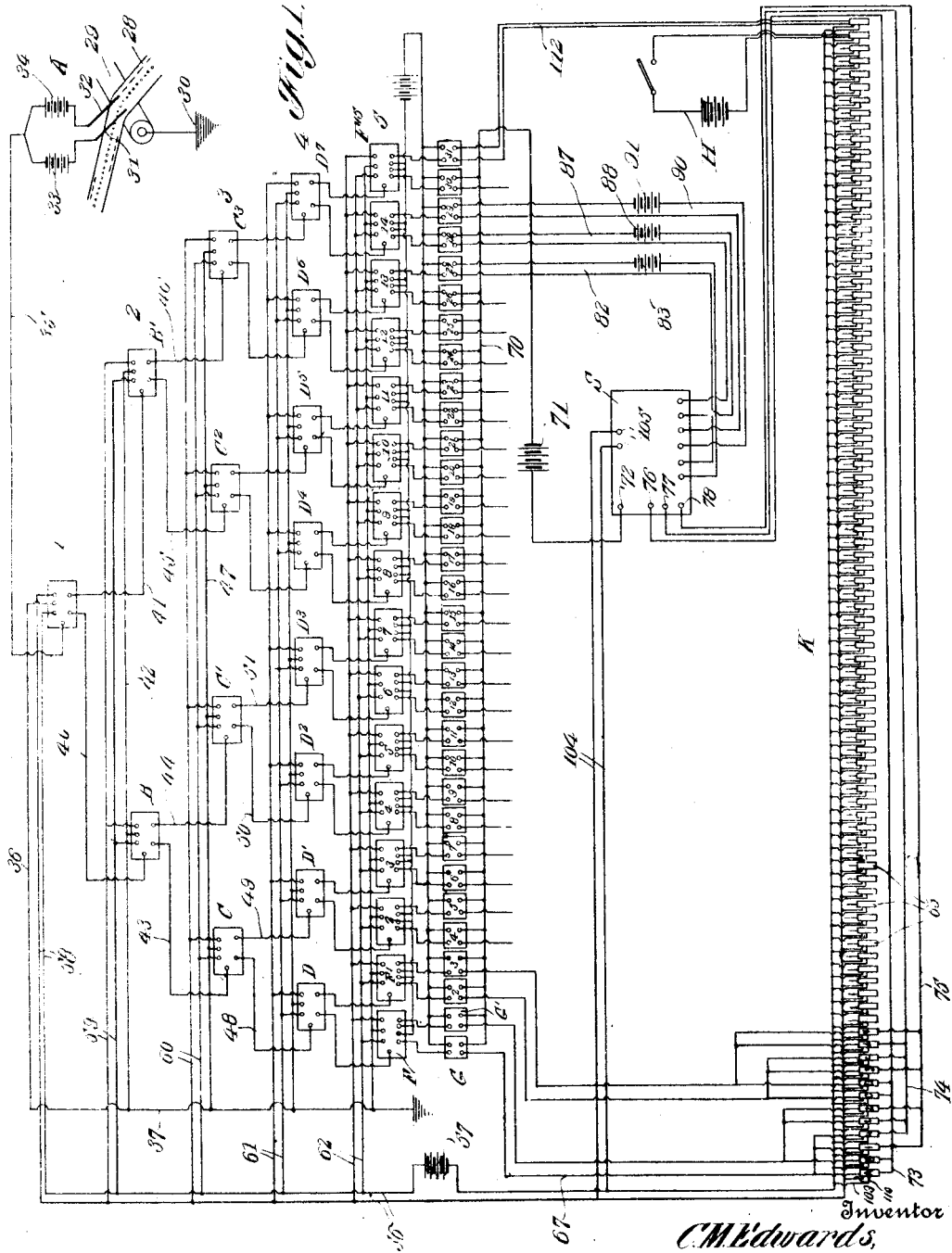

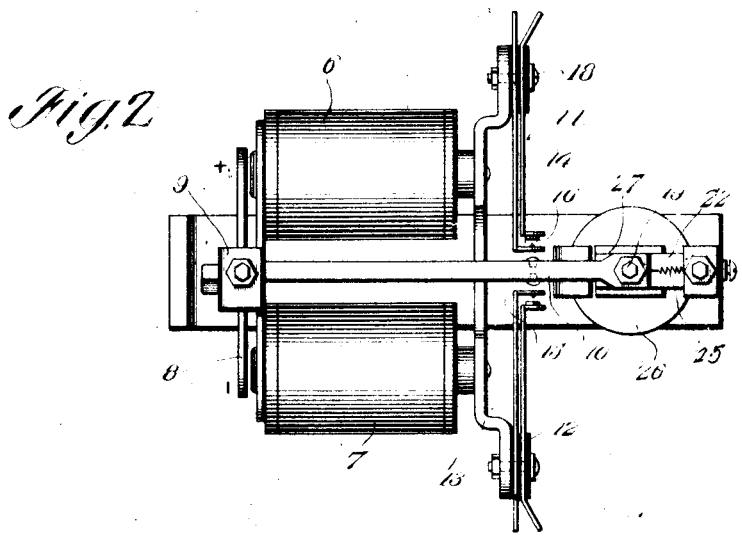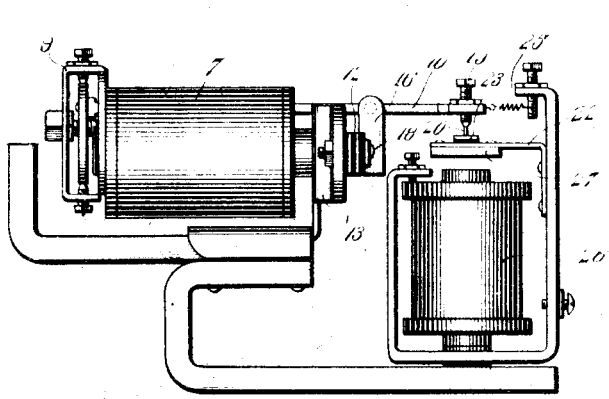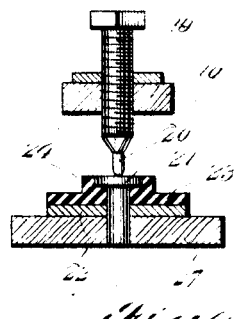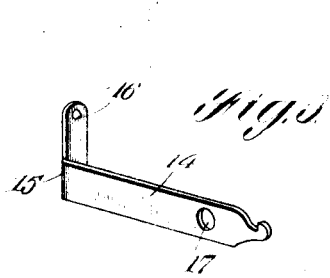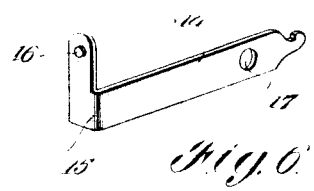

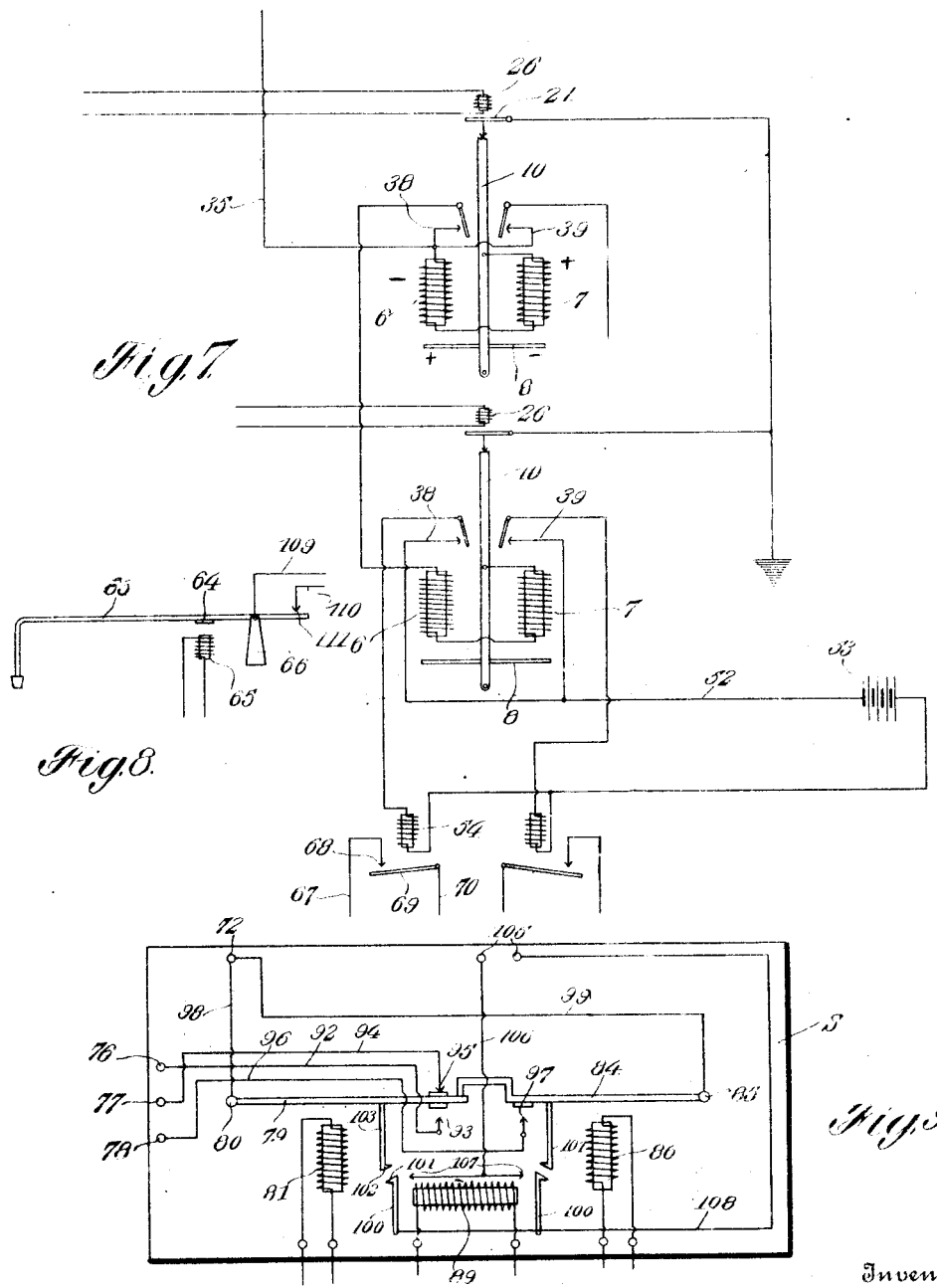

CLAUDE M. EDWARDS, OF GALVESTON, TEXAS.

SELECTIVE TELEGRAPH SYSTEM.

1,068,869.

Specification of Letters Patent.

Patented July 29, 1913.

Application filed September 6, 1912. Serial No. 718,836.

*To all whom it may concern:*

Be it known that I, CLAUDE M. EDWARDS, a citizen of the United States of America, residing at Galveston, in the county of Galveston and State of Texas, have invented new and useful Improvements in Selective Telegraph Systems, of which the following is a specification.

This invention relates to improvements in telegraph systems and has particular application to a selective telegraph system.

In carrying out the present invention, it is my purpose to provide a telegraph system whereby a current may be directed to any one of a series of points and wherein the selecting means for directing the current to the selected point will be cut out of the path of the current so as to minimize the resistance offered to the current impulses.

It is also my purpose to provide a selective telegraph system wherein the selecting means for directing the current impulses to the particular point may be restored to normal position, preferably automatically succeeding the operation of the selecting means to direct the current impulses to the selected point.

In another aspect, my invention involves the combination of a series of actuating devices and means whereby current impulses may be directed to any particular or selected actuating device of the series to energize such actuating device, with a number of manipulating devices controlled by each actuating device, and a master selector by means of which any particular one of the manipulating devices controlled by the energized actuating device may be selected and operated independently of the remaining manipulating devices controlled by such energized actuating device, means being employed and operated from the master selector and the manipulating devices to restore the selecting means of the actuating devices to normal position immediately succeeding the operation of the master selector and the manipulating devices, so that following series of electric current impulses may be passed through the selecting means of the actuating devices to cause the operation of the master selector and the manipulating devices in the minimum time and in accordance with the nature or character of the impulses.

It is also my purpose to provide a combined selective telegraph system and coöperating apparatus whereby the key board of linotype or other machines and apparatus may be operated at a remote or distant point and which will be efficient and reliable in use, comparatively easy to install and maintain and capable of application to any type of machine or apparatus employing a key board without changing the construction of such apparatus or machine.

With the above and other objects in view, the invention consists in the construction, combination and arrangement of parts hereinafter set forth in and falling within the scope of the claims.

In the accompanying drawings; Figure 1 is a diagrammatic view of a selective telegraph system and coöperating apparatus constructed in accordance with the present invention. Fig. 2 is a top plan view showing one of the selecting devices employed in the telegraph system. Fig. 3 is a side elevation of the same. Fig. 4 is an enlarged sectional view through a detail of one of the selecting devices. Figs. 5 and 6 are detail perspective views of the contacts used in conjunction with the selecting devices of the telegraph system. Fig. 7 is a diagrammatic view of a portion of the telegraph system. Fig. 8 is a diagrammatic view of one of the manipulating devices, and Fig. 9 is a diagrammatic view of the master selector for controlling the manipulating devices.

In the present form of my invention each letter, character or signal is transmitted and represented by the same number of successive impulses and both positive or plus and negative or minus impulses are employed, the different letters, characters and signals being identified and differentiated by the order of the successive impulses. These impulses are of any desired length or duration and need not be any longer than is necessary to effect the desired movement or action of the receiving apparatus. The number of impulses employed for each letter, character or signal may be more or less as the number of different characters, letters or signals to be transmitted may be rendered necessary. For instance, if the system requires the transmission of letters not exceeding thirty-two in number, five impulses for each character or signal will suffice and in such a system the letter "a" may be represented and transmitted by five positive or plus impulses, the letter "b" by four positive or plus and a final negative or minus impulse, and so on.

In the form of my invention selected for illustrative purposes, the group of impulses constituting each character, letter or signal actuates a selecting device in the form of a polarized relay to move the armature of the latter out of its normal or zero position, the armature of the relay moving in one direction if the first transmitted impulse of each group is plus and in the opposite direction if the initial impulse of each group is minus. In the movement of the armature of the first relay or selecting device, the coils of such relay or device are cut out of the path of the current and a direct connection established between the line and the respective selecting device of the following series so that immediately after the first selecting device is operated under the action of the initial impulse, a direct path for the following impulse is formed between the line and the selecting device of the second series corresponding to the first impulse, the various impulses of each group being directed by means of the selecting devices of the system to the particular actuating device corresponding to the respective group of impulses.

The system or apparatus contains a selective means, in the present instance, in the form of successive series of selecting devices composed of polarized relays and cut-out switches under the control of such relays, of such capacity or range as is commensurate with the number of successive impulses contained in the group which represents a character or signal. My invention in its present form is constructed for a group of five impulses and contains five series of relays and switches. The first impulse in the group is directed to a relay in the first series; the second impulse to a relay in the second series; the third impulse to a relay in the third series; the fourth impulse to a relay in the fourth series, and the fifth impulse to a relay in the fifth or last series, which relay causes the energization of the particular actuating device corresponding to the group of impulses transmitted. Each relay after being energized or actuated is automatically cut out of the path of a following impulse and in accordance with my present invention is locked in such position and closes the circuit to the particular relay of the following series corresponding to the character of the impulse which causes the actuation of the first mentioned relay. After the selected actuating device has been energized, the selecting devices or polarized relays of the selecting means of the system are restored to normal, so that a following group of impulses may be directed to the particular actuating device corresponding thereto.

Certain actuating devices of the selective system each control a plurality of manipulating devices, while certain of the remaining actuating devices of the selective system control a master or key selector by means of which any one of the manipulating devices controlled by the energized actuating device may be caused to operate independently of the remaining manipulating devices of the group controlled by the respective actuating device.

Referring now to the accompanying drawings in detail, the numeral 1 indicates what may be termed the controlling relay of the receiving apparatus, while the numerals 2, 3, 4 and 5 designate successive series of selecting relays, the last mentioned relays with the controlling relay 1 forming the selective means of the system. Each succeeding series of selecting relays includes two relays controlled by a relay of the preceding series and responsive to plus or positive and minus or negative impulses, according to the nature of the impulse sent through the relay of the preceding series.

Each relay of the selecting means is of the polarized type and comprises a pair of magnets 6, 7 wound in relatively opposite directions and responsive to minus and plus impulses respectively, and a magnetized armature 8 having the opposite poles thereof disposed within the influence of the poles of the magnets 6, 7 and pivoted between its ends within a suitable bracket 9 carried by the adjacent portions of the magnets 6, 7. The magnets 6, 7 of each polarized relay control a cut-out switch composed, in the present instance, of a lever 10 suitably secured at one extremity to the pivoted armature 8 and disposed longitudinally of and between the respective pair of magnets, and pairs of contacts 11, 11 disposed at the opposite sides of the lever, the contacts of each pair being insulated from each other as at 12 and are suitably secured to a bracket 13 carried by the magnet.

In the present instance, each contact of a pair is composed of a spring strip 14 arranged parallel with the spring strip of the companion contact and bent upon itself at one extremity as at 15 and thence extended laterally to form the contact point 16 lying parallel with a similar point of the other contact, the opposite ends of the strips 14 of each pair of contacts being provided with openings 17 designed to register with each other and with an opening in the respective end of the bracket 13 to receive the securing bolt or screw 18. The free end of the lever 10 has threaded therethrough a headed pin 19 formed at its free extremity with a contact point 20 normally resting upon a ground plate 21 carried by an angular spring arm 22 which latter, owing to its resiliency, urges the ground plate 21 against the contact point 20 on the pin 19. Surrounding the ground plate 21 on the respective limb of the angular arm 22 is a block of suitable insulating material 23 equipped with an offset boss 24 surrounding the head of the ground plate and lying flush therewith. Suitable tension means as a spring 25 is connected to the free end of the lever 10 to hold the latter in normal position and coaxial with the ground plate 21. The offset boss 24 of the block of insulating material 23 carried by the spring arm 22 forms a mechanical lock whereby, when the lever 10 is moved to one side or the other of its normal position under the action of the relay to close the contacts at the respective side, the contact point 20 of the pin 19 rides off of the ground plate 21 and is lodged against the respective side of the boss 24, incident to the springy nature of the arm 22, and remains in such position until relieved of the influence of the lock, as will be hereinafter described. The restoring means for each cut-out switch controlled by the selecting relays includes, in the present instance, a magnet 26 disposed in a plane at right angles to the plane of the magnets 6, 7 and arranged below the spring arm 22 and designed to attract an armature 27 secured to the side of the limb of the spring arm 22 opposite from the ground plate and block of insulating material. Thus, when the restoring magnet 26 of a selecting relay is energized, the boss 24 is withdrawn from the path of movement of the contact point 20 on the pin 19 whereby the latter and the lever 10 may be returned to normal position under the action of the spring 25, the contact point 20 reengaging the ground plate 21. Any suitable means may be employed for holding the various magnets of each relay and the parts coöperating therewith assembled.

In the present instance, the impulses are produced at the sending station A by a perforated ribbon 28 passing over a conducting roller or surface 29 which is grounded at 30, and two brushes 31 and 32 adapted to make contact with the roller through the two rows of perforations in the strip which represent the letters, characters or signals to be transmitted. These brushes are connected with two batteries 33, 34 in such manner that one brush produces plus or positive impulses and the other minus or negative impulses. It is conceivable, however, that other suitable means may be employed for producing the impulses.

The numeral 35 indicates the main line which has one terminal connected to the batteries 33, 34, and the opposite terminal thereof extended through the windings of the magnets 6 and 7 of the controlling relay 1, thence to ground by way of the lever 10, contact point 20, ground plate 21, conductor 36 to common ground conductor 37. The impulses are sent successively through the main line 35 and the initial impulse of each group or series of impulses causes the magnets 6, 7 of the controlling relay 1 to move the lever 10 out of its normal or zero position, in one direction or the other, according to the nature of the said initial impulse.

After the initial impulse of a group or series of such impulses has energized the respective magnet of the controlling relay 1, the lever 10 closes the respective pair of contacts 11 so that the preceding impulse may be directed into the corresponding relay of the following series, and the lever 10 is locked against return to normal position until the required number of impulses have passed through the selecting means and to the desired or predetermined point. One contact of each pair 11 of the cut-out switch controlled by the magnets of the controlling relay is connected to the line conductor 35, as at 38, 39, while the remaining contacts of the pairs 11, 11 are connected with the windings of the magnets of plus and minus selecting relays B, B' of the series 2, by way of conductors 40, 41 respectively. The conductors 40 and 41 are extended through the windings of the magnets of the respective relays and are grounded upon the ground plate 21, as described, for the controlling relay 1, while these wires or conductors 40, 41 are also connected to one side of the cut-out switch controlled by the respective relay, the ground plates of the selecting relays B, B' of the series 2 being connected to a common conductor 42, thence to the common ground conductor 37.

For the purposes of this description, it will be assumed that the winding of the impulse receiving magnet of the controlling relay 1 is such that a minus impulse will cause the magnet 6 to present a negative pole to the positive pole of the magnetized armature 8, and the magnet 7 a negative pole to the negative pole of the magnetized armature 8, while a positive impulse through the line will cause the negative pole of the magnet 6 to present a positive pole to the similar pole of the magnetized armature and the magnet 7 a positive pole to the negative pole of the magnetized armature. Thus, when a negative impulse is sent through the main line, the magnet 6 will be energized to attract the respective pole of the armature 8 while the magnet 7 will be energized to repel the respective pole of the magnetized armature, the impulse passing through the energized magnet and to ground, as described. When the magnets are energized as said, the lever 10 is moved to the right of its normal position, thereby breaking the ground connection of the magnets 6, 7 and closing the pair of contacts 11 to the right of the lever with the effect to close the circuit to the negative relay B' of the second series and cut the windings of the magnets of the controlling relay out of the circuit or path of the following impulses. On the other hand should a plus impulse be sent over the main line at the head of a group of impulses, the plus or positive magnet 7 will be energized to attract the armature while the negative magnet 6 will repel the armature, thereby moving the lever 10 to the left of its normal position and closing the circuit to the positive relay B of the second series, the windings of the magnets of the controlling relay being cut out of the path of the succeeding impulses of the particular group. When the lever 10 moves to one side or the other under the action of the magnets, such lever is locked against return to normal, as previously described, thereby cutting the windings of the magnets of the controlling relay out of the circuit. Thus, it will be seen that the batteries or other sources of energy at the sending station energize the selecting relays of the receiving apparatus, while the latter, immediately succeeding the energization thereof are automatically cut out of the path of following impulses and close the circuit to a selecting relay of a following series corresponding to the nature of the impulse sent through the relay of the preceding series. When the circuit is closed to the plus selecting relay B of the second series by an initial plus or positive impulse passing through the windings of the controlling relay 1, if the second impulse of the group or series be plus, such impulse passes through the windings of the magnets of the plus selecting relay B to ground by way of the conductors 42 and 37. The lever 10 of the plus selecting magnet of the second series is, as a result of the energization of the magnets of said relay, moved to the left to close the contacts of the cut-out switch and so cut the windings of the said relay magnet out of the circuit and establish a direct path for the current to a plus selecting magnet C of the third series, by way of a conductor 43. On the other hand, should a negative impulse succeed the initial positive impulse, the magnets of the plus selecting relay B of the second series will be energized in such manner that the lever 10 controlled thereby will be moved to the right, thereby closing the circuit to a negative or minus selecting magnet C' of the third series and cutting the magnets of the plus selecting relay of the second series out of the circuit, whereby a direct path for the following or third impulse to the negative selecting magnet C' of the third series is afforded by way of a conductor 44. However, should the first or initial impulse of a group be negative, the controlling relay 1 will be actuated to close the circuit to the negative or minus selecting magnet P' of the second series, the coils of the magnet of the controlling relay being cut out of the circuit as aforementioned. Should a succeeding or second impulse of the group be positive, the minus selecting relay B' of the second series will be actuated in such manner that the cut-out switch of said minus selecting relay will be actuated to cut the coils of said relay out of the circuit and establish a direct path for the third impulse to the positive selecting relay $C^2$ of the third series by way of a conductor 45. On the contrary, should the second impulse be negative, the minus selecting relay B' of the second series will be influenced in such manner that the cut-out switch controlled thereby will be actuated to cut the coils of such relay out of the circuit and establish a direct path for the third impulse to the negative selecting magnet $C^3$ of the third series by way of a conductor 46. A conductor 47 is common to the ground plates of the magnets of the selecting relays of the third series and is terminally connected to the common ground conductor 37, whereby a complete circuit may be established for the various selecting relays of the said series.

The described switching or circuit closing of the system and the cutting out of the coils of the actuated selecting relay, in which each selecting relay of one series controls a plus and minus relay in the following series, can be extended through a series of as many selecting magnets as is necessary to represent the number of final actuating devices or circuit closers as they may be termed, as the system requires. In the embodiment of my invention selected for illustrative purposes, the selecting magnets of the fourth series are indicated at D, D' to $D^7$, inclusive, and the final selecting relays, sixteen in number, are denoted by F, F' to $F^{15}$ inclusive, while the actuating relays or circuit closers which are selectively energized through the selecting relays of the system, are indicated at G, G' to $G^{31}$ inclusive.

Having described the operation of the controlling relay, which may be called the first series of selecting relays, and the second and third series and their manner of selective energization, the operation of the fourth and fifth series of selecting relays may be described as follows. If the first, second, and third impulses are plus, it is evident that the plus selecting relay C in the third series operates in such manner as to close the circuit to the plus selecting relay D of the fourth series by way of a conductor 48 while the coils of the plus selecting magnet C of the third series are cut out of the path of the succeeding impulse. If the first and second impulses are plus and the third minus, the plus selecting relay C of the third series becomes energized and actuates the cut-out switch to close the circuit to the minus selecting relay D' of the fourth series by way of a conductor 49, the coils of the plus selecting relay C being cut out of the circuit. If the first impulse is plus, the second minus and the third also plus, the minus selecting relay C' of the third series will be actuated to close the circuit to the plus selecting relay D² of the fourth series by way of a conductor 50; whereas, a plus and two successive minus impulses will cause the minus selecting relay C' of the third series to close the circuit to the minus selecting relay D³ of the fourth series by way of a conductor 51. Should the first four impulses be plus, the plus selecting relay D of the fourth series will be energized, the cut-out switch controlled by such relay actuated to close the circuit to the plus selecting magnet F of the fifth series, and the winding of such relay D cut out of the circuit, and if the fifth impulse is also plus, the plus or positive magnet of the selecting relay F of the fifth series will be energized, while if the fifth impulse is negative or minus, the negative magnet of such relay will be energized. If the first three impulses are plus and the fourth minus, the plus selecting relay D of the fourth series will be operated to actuate the cut-out switch controlled thereby whereby the circuit will be closed to the minus selecting relay F of the fifth series, the coils of the relay D of the fourth series being cut out of the circuit, of course. A fifth positive impulse succeeding three positives and a negative will energize the plus magnet of the selecting relay F of the fifth series, while a final minus impulse will energize the minus or negative magnet of the relay F'. Two plus and one minus impulse will cause the plus selecting relay C of the third series to close the circuit to the minus selecting relay D' of the fourth series, while the fourth positive impulse will energize the minus selecting relay D' of the fourth series to close the circuit to the positive selecting relay F² of the fifth series, a final plus or minus impulse actuating the plus selecting relay F² of the fifth series in accordance therewith. Thus, it will be seen, that the selecting relays of the fifth series from F to F⁴ inclusive are on the plus or positive side of the receiving apparatus and any one of such relays will be energized in accordance with the order of the successive impulses, the initial impulse entering the controlling relay 1 being of course positive or plus. The remaining selecting relays F⁸ to F¹⁵ inclusive of the fifth series are arranged on the negative or minus side of the system and are controlled by the like relays of the preceding series and energized in accordance with the order of successive impulses sent through such previous relays, the first impulse entering the controlling relay 1 being negative, of course.

The final series of selecting relays F to F¹⁵ inclusive, are each constructed as shown diametrically in Fig. 7 and are identical in construction to the selecting relays of the preceding series, except that one of the contacts is wired to the common power lead 52 of a local circuit including a suitable source of energy as a battery 53, while the remaining contact of each pair of each selecting relay of the final series is wired to one terminal of the magnet 54 of the respective actuating device or circuit closer, the remaining terminals of the magnets of the circuit closers being wired to the other lead 54 of the local circuit. Thus, it will be seen that when one of the selecting relays of the final series of such relays is energized, the cut-out switch controlled thereby will be actuated in such manner as to close the local circuit and so energize the respective actuating device or circuit closer, two of the latter being controlled by each selecting relay of the final series and one or the other operated or energized in accordance with the order of the successive impulses sent through the selecting means of the system.

Immediately succeeding the operation of the selected circuit closer or actuating device, the restoring magnets 26 of the selecting relays of the system, are energized automatically in this instance, to relieve the locked selecting relays of the influence of the locking means, as previously described, the restoring magnet of the controlling relay 1, and the similar magnets of the selecting relays of the second, third, fourth and fifth series being wired in multiple to a restoring circuit, composed of conductors 56 and a source of energy as a battery 57, by way of conductors 58, 59, 60, 61 and 62 respectively. Thus, when the restoring circuit is closed, the cut-out switches controlled by the selecting relays are relieved of the influence of the locking means and restored to normal positions.

It is conceivable that the actuating devices or circuit closers selectively controlled by the selecting relays may be utilized for various purposes. In the present form of my invention, I employ the same to cause the operation of manipulating devices whereby the key boards of linotype machines may be operated.

The key boards of linotype machines usually employ three banks of keys, the capital letters being embraced in one bank, small letters in another bank, and the figures, numerals, characters or other symbols in another bank. In the present instance, like keys of all banks are controlled by each actuating device or circuit closer. For the purpose of illustration, we will assume that the letters A, a and the numeral 1, are like keys in the various banks. The manipulating devices for operating these several keys are all controlled from a single actuating device or circuit closer, but the circuit of only one of such actuating devices is closed, according to the impulses sent through the selecting relays of the telegraph. These impulses for determining which key of the machine is to be operated, are sent through the telegraph system to one of the actuating devices thereof, previous to the impulses for causing the energization of the particular actuating device or circuit closer controlling this group of manipulating devices. In other words, if the key on the linotype machine representing A is to be actuated, the tape 28 is perforated to cause the transmission of impulses to an actuating device or circuit closer by way of the selecting relays of the telegraph, and the energized actuating device causes the operation of a key selector to effect the closing of the circuit through the manipulating device for the key bearing the A upon the linotype machine. Likewise, if it is desired to depress a key upon the linotype machine bearing a numeral, the perforations of the tape in advance of those representing such numeral, will cause the transmission of impulses to the key selector to close the circuit to the manipulating device of the key on the linotype machine bearing the particular numeral. This key selector normally maintains a position to effect the closing of the circuit to the manipulating devices of the small letters and is actuated or moved out of such position for the printing of figures or other characters, as clearly disclosed in my copending application Serial Number 689,460, filed April 9, 1912.

In the accompanying drawings, the connections between only four of the actuating devices or circuit closers controlled by the selecting relays of the telegraph system and the manipulating devices for the keys of the linotype machine, are shown, such being thought sufficient for the purpose of this invention. The key board of the linotype machine is indicated diagrammatically by K in Fig. 1, and as aforesaid is divided into or embraces three banks or sets of keys embodying the capital letters, small letters and numerals or characters respectively. The manipulating devices for the keys each, in the present instance comprises an angular finger 63 equipped at an appropriate point with an armature 64 disposed within the influence of a magnet 65, the finger being pivoted to a suitable support as at 66.

As before stated, each actuating device or circuit closer G to $G^{31}$ inclusive controls a key in each bank or three keys upon the key board of the linotype machine. For instance, the magnets 65 of the manipulating devices controlling the keys on the key board of the linotype machine bearing the letters A, a and the figure 1, are arranged in a circuit including a conductor 67 terminating in a contact point 68 disposed adjacent to an armature 69 under the influence of the magnet 54 of the respective circuit closer or actuating device, the device G in the present case. To the armature 69 of each actuating device or circuit closer is connected a common conductor 70 including a source of energy as a battery 71 and terminating in a contact 72 of the key selector S. From the remaining terminals of the magnets 65 controlling the respective group of keys, lead conductors 73, 74 and 75 respectively, each common to the magnets of the manipulating devices of one bank of keys. These conductors 73, 74 and 75 terminate in binding posts 76, 77 and 78 respectively in the key selector. This key selector may be of any suitable or preferred construction and in the present instance comprises an armature 79 pivoted as at 80 and disposed within the influence of an operating magnet 81 arranged in a local circuit 82 including a source of energy as a battery 83 and controlled by one of the actuating devices or circuit closers in the telegraph system, as the circuit closer $G^{27}$ for instance; an armature 84 pivoted as at 85 and disposed within the influence of an operating magnet 61 arranged in a local circuit 87 including a source of energy as a battery 88 and controlled by one of the actuating devices or circuit closers of the telegraph system, as the device $G^{28}$, and the releasing magnet 89 arranged in a local circuit 90 including a suitable source of energy as a battery 91 and controlled by one of the actuating devices or circuit closers as the device $G^{29}$, for instance. Leading from the binding posts 76 in the key selector to which the free terminal of the common wire 73 is connected, is a conductor 92 terminating in a contact point 93 at one side of the armature 79, while from the binding post 77 of the common conductor 74 leads a wire 94 terminating in a contact point 95 at the opposite side of the armature 79. From the binding post 78 of the common wire or conductor 75, leads a wire 96 terminating in a contact point 97 beneath the armature 84, while to the armature 79 and 84 are connected branch wires 98, 99 respectively terminating in the binding post 72 of the conductor 70. With in the influence of each pole of the releasing magnet 89 is an armature 100 equipped with a hook 101 adapted to receive a similar hook 102 carried by the free extremity of an arm 103 depending from each of the armatures 79 and 84.

It will be seen that each actuating device or circuit closer of the telegraph system controls a group of manipulating devices, while the key selector S controls the individual manipulating devices of the group controlled by the energized actuating device, whereby the particular manipulating device only of the group is actuated to manipulate the desired or selected key upon the key board.

From the foregoing description taken in connection with the accompanying drawings, the construction, mode of operation and manner of employing my invention will be readily apparent. Should it be desired to operate the manipulating device controlling the key bearing the letter A on the linotype machine, a series of five impulses are, by means of the selecting relays of the telegraph system directed to the actuating device or circuit closer $G^{27}$. The magnet 54 of the latter now attracts the armature 69 with the effect to close the local circuit 82, thereby energizing the magnet 81, with the result that the latter is swung about its pivot 80 and engaged with the contact 93, the hook 102 of the arm 103 engaging the hook 101 of the armature 100 to lock or maintain the armature 79 in the desired position. As has been said, the impulses sent through the selecting relays to influence the circuit closer $G^{27}$ to close the local circuit of the operating magnet 81 are caused by perforations formed in the tape in advance of the perforations representing the letter A, that is the perforations controlling the actuating device G of the manipulating device of the key bearing the said letter. Before the following impulses, representing the letter, can be sent through the selecting relays of the system, the locked selecting relays have to be released and restored to normal positions. To accomplish this, I multiple to the conductors 56 of the restoring circuit a pair of conductors 104, the latter terminating in binding posts 105 from one of which leads the wire 106 connected to two contact points 107, 107 each disposed immediately adjacent to one of the armatures 100, 100, while from the other binding post 105 leads a wire or conductor 108 connected to the armatures 100, 100. Thus, when the armature 79 is drawn downwardly to engage the contact 93, and the armature 100 swung, incident to the hook 102 of the arm 103 passing the hook 101 on the said armature 100, the latter engages the respective contact 107 thereby closing the restoring circuit and energizing the restoring magnets of the selecting relays whereby the latter are returned to their normal positions. The following impulses to cause the actuation of the particular actuating device or circuit closer, are now free to pass through the selecting relays of the system and energize the selected actuating device, the device G in the present instance. Upon the energization of the device G, a circuit, for the magnet 65 controlling the finger 63 and forming with such finger the manipulating device bearing the letter A, is formed as follows, conductor 67, winding of the magnet 65, conductor 73, wire 92, contact point 93, armature 79, wire 98, binding post 72, battery 71 and conductor 70, the latter being the common wire for all of the actuating devices, thence through the armature 69 and contact point 68. Immediately succeeding the operation of the particular manipulating device, the locked selecting relays of the telegraph system are restored to normal position. This is accomplished by extending the conductors 56 of the restoring circuit, as shown in Fig. 1, and connecting in multiple or parallel with such conductors, wires 109 and 110. The wires 109 are connected to the fingers 63, while the wires 110 terminate in contacts 111 immediately adjacent to the free ends of the fingers. Thus, when any finger is depressed the restoring circuit is closed and the selecting relays of the telegraph system restored to their normal positions. The purpose of restoring the operated selecting relays of the telegraph system from the manipulating devices, is to enable the impulses for causing the actuation of the actuating devices or circuit closers G to $G^{31}$ inclusive to be restored automatically so that any number of capital letters, small letters or figures as the case may be may be printed in rapid succession.

To print the figures, the operating magnet 86, controlling the armature 84 is energized in a manner similar to the energization of the operating magnet 81, but by a different order of impulses, while the manner of energizing the releasing magnet 89 for releasing the armatures 79 and 84 after each has performed its function is also similar to the manner of energizing the operating magnet 81 and 86. When the releasing magnet 89 is operated, the locked armature 79 or 84 as the case may be, returns to its normal position and the restoring circuit is again closed from the selector to restore the selecting relays of the telegraph system through which the impulses to operate the releasing magnet 89 passed.

As in my copending application hereinbefore referred to, the armature 79 normally engages the contact 95 and so permits the printing of small letters without resorting to operating the key selector, while the armature 84 in its movement to engage the contact 97 for the printing of figures and other characters, disengages the armature 79 from the contact 95 and holds the same between the contacts 93 and 95.

It will be seen that the selecting relays of the telegraph system are automatically restored to normal position immediately succeeding the operation of the key selector and the key manipulating devices, thereby enabling successive series or groups of impulses to be sent through the selecting relays of the telegraph system and furthermore, it will be noted that each actuating device or circuit closer of the telegraph system controls one break in a circuit including a number of manipulating devices, while the key selector controls a second break in such circuit and enables a predetermined or selected manipulating device to be operated independently of the remaining devices of the particular group controlled by the energized actuating device.

H indicates a normally open circuit including a suitable source of energy as a battery and provided with a circuit closer whereby the circuit may be closed to operate suitable mechanism for arranging the matrices of the linotype machine to print in italics, while the actuating device or circuit closer $G^{31}$ controlled by the selecting relays of the telegraph system is adapted to close a circuit 112 whereby suitable mechanism may be operated to shift the linotype.

While I have herein shown and described one preferred form of my invention by way of illustration, I desire to have it understood that I do not limit or confine myself to the precise details of construction herein described and delineated, as modification and variation may be made within the scope of the claims and without departing from the spirit of the invention.

I claim:

1. In a telegraph system, a series of actuating devices, successive series of selecting devices whereby a current may be directed to a particular or selected actuating device, mechanical locking means for locking each selecting device immediately succeeding the energization thereof whereby a following impulse may be directed into the corresponding selecting device of the succeeding series.

2. In a telegraph system, a series of actuating devices, successive series of selecting devices whereby a current may be directed to a particular actuating device, and mechanical locking means operable automatically for locking each selecting device whereby a following impulse may be directed into the corresponding selecting device of the succeeding series.

3. In a telegraph system, a series of actuating devices, successive series of selecting devices whereby a current may be directed to a particular actuating device, and mechanical locking means operable automatically from each selecting device for locking the same immediately succeeding the energization thereof whereby a following impulse may be directed into the corresponding selecting device of the succeeding series.

4. In a telegraph system, a series of actuating devices, successive series of selecting devices whereby a current may be directed to a particular or selected actuating device, means for cutting each selecting device out of the path of the succeeding impulse subsequent to the energization of such device whereby a following impulse may be directed into the corresponding selecting device of a succeeding series without passing through the previously energized selecting device, and mechanical locking means for locking said cutting out means.

5. In a telegraph system, a series of actuating devices, successive series of selecting devices whereby a current may be directed to a particular or selected actuating device, means for cutting each selecting device out of the path of the succeeding impulse subsequent to the energization of such device whereby a following impulse may be directed into the corresponding selecting device of a succeeding series without passing through the previously energized selecting device, mechanical locking means for locking said cutting out means, and means for relieving said cutting out means of the influence of said locking means.

6. In a telegraph system, a series of actuating devices, successive series of selecting devices whereby a current may be directed to any one of said actuating devices automatically, means under the control of each selecting device and adapted to be operated thereby whereby the circuit may be closed to a corresponding device in the following series upon the energization of the first device and the first device cut out of the circuit, and mechanical locking means for locking the last-named means in operated position.

7. In combination, a series of actuating devices, means whereby a current may be directed to a particular actuating device to operate the latter, mechanical locking means for locking the first means immediately succeeding the energization thereof, and means for restoring said first means subsequent to the energization of the said actuating devices.

8. In a telegraph system, a series of actuating devices, successive series of selecting devices whereby a current may be directed to a particular or selected actuating device, mechanical locking means for locking each selecting device immediately succeeding the energization thereof whereby a following impulse will be directed into the corresponding selecting device of the succeeding series, and means for relieving said selecting device of the influence of said locking means.

9. In a telegraph system, a series of actuating devices, successive series of selecting devices whereby a current may be directed to a particular or selected actuating device, a cut-out switch operable from each selecting device whereby the same may be cut out of the path of a following impulse, mechanical locking means for locking said cut-out switch subsequent to the energization of the respective selecting device, and means for relieving the cut-out switches of the influence of the locking means.

10. In a telegraph system, a series of actuating devices, successive series of selecting devices whereby a current may be directed to a particular or selected actuating device, a cut-out switch operable from each selecting device whereby the same may be cut out of the path of a following impulse, mechanical locking means for locking said cut-out switch subsequent to the energization of the respective selecting device, and automatic means for relieving the cut-out switches of the influence of the locking means.

11. In a telegraph system, a series of actuating devices, selecting devices whereby a current may be directed to a particular or selected actuating device, cut-out switches for cutting each selecting device out of the path of the current succeeding the energization thereof, mechanical locking means for locking said switches in cut out position, and means for relieving said switches of the locking means.

12. In combination, a series of actuating devices, means whereby a current may be directed to a particular actuating device to energize the latter, mechanical locking means for locking the first-named means, a group of manipulating devices under the control of said actuating devices, and means operable from said manipulating devices whereby said first-named means may be relieved of the influence of said locking means.

13. In combination, a series of actuating devices, selecting devices whereby a current may be directed to a particular actuating device to energize the latter, means for cutting said selecting device out of the path of the current immediately succeeding the energization thereof, mechanical locking means for locking the last-named means, a group of manipulating devices under the control of each of said actuating devices, and means operable from said manipulating devices whereby said second-named means may be relieved of the influence of the locking means.

14. In combination, a telegraph system comprising a series of actuating devices, successive series of selecting devices whereby a current may be directed to a particular actuating device to energize the latter, a group of manipulating devices under the control of each of certain actuating devices, a selector under the control of certain of the remaining actuating devices and controlling the individual manipulating devices, under the control of the respective actuating devices whereby any particular manipulating device of the group controlled by the energized actuating device may be operated, means for resetting the selector to normal, and means operable in the resetting operation to restore the operated selecting devices.

15. In combination, a telegraph system comprising a series of actuating devices, successive series of selecting devices whereby a current may be directed to a particular actuating device to energize the latter, mechanical locking means for locking each selecting device immediately succeeding the energization thereof whereby a following electric impulse may be directed into the corresponding selecting device of the succeeding series and so on into the particular actuating device, a group of manipulating devices under the control of each of certain actuating devices, a selector under the control of certain of the remaining actuating devices and controlling the individual manipulating devices under the control of the respective actuating devices whereby any particular manipulating device of the group controlled by the energized actuating device may be operated, means for resetting the selector to normal, and means operable in the resetting operation to restore the selecting devices to normal position.

16. In combination, a series of actuating devices, selecting devices whereby a current may be directed to a particular actuating device to energize the latter, means for cutting the selecting devices out of the path of the current immediately succeeding the energization thereof, mechanical locking means for locking the last-named means, a group of manipulating devices under the control of each of certain actuating devices, a selector under the control of certain of the remaining actuating devices and controlling the manipulating devices under the control of the respective actuating devices whereby any particular manipulating device of the group controlled by the energized actuating device may be operated, means for resetting the selector to normal, and means for relieving the cutting out means of the influence of the locking means.

17. In combination, a series of actuating devices, selecting devices whereby a current may be directed to a particular actuating device to energize the latter, means for cutting the selecting devices out of the path of the current immediately succeeding the energization thereof, mechanical locking means for locking the last-named means, a group of manipulating devices under the control of each of certain actuating devices, a selector under the control of certain of the remaining actuating devices and controlling the manipulating devices under the control of the respective actuating devices whereby any particular manipulating device of the group controlled by the energized actuating device may be operated, means for resetting the selector to normal, and means for relieving the cutting out means of the influence of the locking means, said last-named means being also operable from the manipulating device immediately succeeding the operation of the latter.

18. In combination, a series of actuating devices, selecting means whereby a current may be directed to a particular actuating device to operate the latter, said means including a plurality of polarized relays responsive to positive and negative electric impulses, means for cutting each relay out of service immediately succeeding the energization thereof, means for locking the last-named means, and means for relieving the first means of the influence of the locking means.

19. In combination, a series of actuating devices, selecting means whereby a current may be directed to a particular actuating device to operate the latter, said means comprising successive series of polarized relays responsive to positive and negative electric impulses, a cut-out switch under the control of each relay for cutting the same out of service immediately succeeding the energization thereof, means for locking said cut-out switch, and means for relieving said switch of the influence of the locking means.

20. In a telegraph system, a series of actuating devices, selecting devices whereby an electric current may be directed to a particular actuating device to energize the latter, a lever connected to and operable from each selecting device, and cut-out switches under the control of each lever and disposed in the path of movement thereof whereby the selecting device will be cut out of service immediately succeeding the energization thereof.

21. In a telegraph system, a series of actuating devices, selecting devices whereby an electric current may be directed to a particular actuating device to energize the latter, a lever connected to and operable from each selecting device, cut-out switches under the control of each lever and disposed in the path of movement thereof whereby the selecting device will be cut out of service immediately succeeding the energization thereof, and means for locking said lever in operated position.

22. In combination, a series of actuating devices, selecting means whereby a current may be directed to a particular actuating device to energize the latter, said means including a plurality of polarized relays responsive to positive and negative electric impulses, switches for cutting each relay out of service immediately succeeding the energization thereof, means for locking said switches in cut out position, and means for relieving said switches of the influence of the locking means.

23. In combination, a series of actuating devices, selecting means whereby a current may be directed to a particular actuating device to operate the latter, said means including successive series of polarized relays responsive to positive and negative electric impulses, automatic switches for cutting each relay out of service immediately succeeding the energization thereof, means for locking said switches in operated position, and means for relieving said switches of the influence of said locking means.

24. In combination, a series of actuating devices, successive series of selecting devices comprising polarized relays whereby a current may be directed to a particular actuating device to energize the latter, means for locking each relay immediately succeeding the energization thereof whereby a following electric impulse may be directed into the corresponding relay of the succeeding series and so on into the particular actuating device, a group of manipulating devices under the control of each of certain actuating devices, a selector under the control of certain of the remaining actuating devices and controlling individual manipulating devices under the control of the respective actuating devices whereby any particular manipulating device of the group controlled by the energized actuating device may be operated, means for resetting the selector to normal, and means operable in the resetting operation to relieve the polarized relays of the influence of the locking means.

25. In combination, a series of actuating devices, selecting devices comprising polarized relays whereby a current may be directed to a particular actuating device to energize the latter, means for cutting each polarized relay out of the path of the current immediately succeeding the energization thereof, means for locking the last-named means, a group of manipulating devices under the control of each of said actuating devices, and means operable from said manipulating devices whereby said second-named means may be relieved of the influence of the locking means.

In testimony whereof I affix my signature in presence of two witnesses.

CLAUDE M. EDWARDS.

Witnesses:
JOHN J. McCARTHY,
BENNETT S. JONES.